United States Patent
Mathiszik

(10) Patent No.: US 11,966,002 B2
(45) Date of Patent: Apr. 23, 2024

(54) SYSTEMS AND METHODS FOR DOWNHOLE DETERMINATION OF DRILLING CHARACTERISTICS

(71) Applicant: Holger Mathiszik, Eicklingen (DE)

(72) Inventor: Holger Mathiszik, Eicklingen (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 1073 days.

(21) Appl. No.: 16/221,670

(22) Filed: Dec. 17, 2018

(65) Prior Publication Data

US 2019/0187316 A1 Jun. 20, 2019

Related U.S. Application Data

(60) Provisional application No. 62/599,075, filed on Dec. 15, 2017.

(51) Int. Cl.
*G01V 1/50* (2006.01)
*E21B 44/00* (2006.01)
(Continued)

(52) U.S. Cl.
CPC ............. *G01V 1/50* (2013.01); *E21B 44/00* (2013.01); *E21B 47/04* (2013.01); *E21B 47/14* (2013.01); *E21B 47/01* (2013.01); *G01V 1/46* (2013.01)

(58) Field of Classification Search
CPC .. G01V 1/50; G01V 1/46; E21B 44/00; E21B 47/01; E21B 47/04; E21B 47/14; E21B 47/095
See application file for complete search history.

(56) References Cited

U.S. PATENT DOCUMENTS

| 3,447,127 A * | 5/1969 | Wiley .................. G01V 1/52 367/33 |
| 4,594,691 A | 6/1986 | Kimball et al. |

(Continued)

FOREIGN PATENT DOCUMENTS

| EP | 0646697 A1 | 4/1995 |
| WO | 2006086417 A1 | 8/2006 |
| WO | 2015174960 | 11/2015 |

OTHER PUBLICATIONS

"Azimuth", Retrieved via internet: https://www.glossary.oilfield.slb.com/Terms/a/azimuth.aspx; Dec. 17, 2018, Schlumberger Oilfield Glossary (1 page).

(Continued)

*Primary Examiner* — Ian J Lobo
(74) *Attorney, Agent, or Firm* — CANTOR COLBURN LLP

(57) ABSTRACT

Downhole drilling characteristic measurement systems for measuring a characteristic of drilling through the earth's subsurface and methods of the same are described. The systems include a downhole tool having an active measurement system, comprising a receiver, a first transmitter, and a second transmitter and a controller in communication with the first transmitter and the second transmitter, the controller configured to control the first transmitter and the second transmitter to transmit a first transmitted signal from the first transmitter and a second transmitted signal from the second transmitter. The receiver is arranged to receive a first received signal from the first transmitted signal and a second received signal from the second transmitted signal. A processor is configured to determine a characteristic of drilling from the first received signal and the second received signal.

18 Claims, 5 Drawing Sheets

(51) Int. Cl.
*E21B 47/04* (2012.01)
*E21B 47/14* (2006.01)
*E21B 47/01* (2012.01)
*G01V 1/46* (2006.01)

(56) References Cited

U.S. PATENT DOCUMENTS

| | | | |
|---|---|---|---|
| 5,339,036 | A | 8/1994 | Clark et al. |
| 5,678,643 | A * | 10/1997 | Robbins ................... G01V 1/46 175/45 |
| 6,206,108 | B1 | 3/2001 | Macdonald et al. |
| 6,769,497 | B2 | 8/2004 | Dubinsky et al. |
| 7,032,707 | B2 | 4/2006 | Egerev et al. |
| 7,873,475 | B2 | 1/2011 | Van Os et al. |
| 7,933,166 | B2 | 4/2011 | Goodman |
| 8,015,868 | B2 | 9/2011 | Hassan et al. |
| 8,215,384 | B2 | 7/2012 | Trinh et al. |
| 8,542,553 | B2 | 9/2013 | Wang |
| 8,571,796 | B2 | 10/2013 | Van Os et al. |
| 8,625,390 | B2 | 1/2014 | Wang et al. |
| 8,636,060 | B2 | 1/2014 | Hernandez |
| 8,813,869 | B2 | 8/2014 | Bennett et al. |
| 9,004,195 | B2 | 4/2015 | Regener et al. |
| 9,238,958 | B2 | 1/2016 | Teodorescu |
| 10,012,067 | B2 * | 7/2018 | Pelletier .................. E21B 10/42 |
| 10,544,668 | B2 * | 1/2020 | Hori ...................... G01V 11/002 |
| 2007/0112521 | A1 | 5/2007 | Akimov et al. |
| 2008/0307875 | A1 | 12/2008 | Hassan et al. |
| 2009/0012710 | A1 | 1/2009 | Van Os et al. |
| 2009/0222209 | A1 | 9/2009 | Morys |
| 2010/0259415 | A1 * | 10/2010 | Strachan .............. G05B 13/048 340/853.6 |
| 2011/0060527 | A1 | 3/2011 | Teodorescu |
| 2011/0280101 | A1 * | 11/2011 | Wang ........................ G01V 1/46 367/25 |
| 2014/0029382 | A1 | 1/2014 | Donderici et al. |
| 2014/0241111 | A1 | 8/2014 | Mickael |
| 2015/0211352 | A1 | 7/2015 | Sugiura |
| 2015/0240617 | A1 | 8/2015 | Pelletier et al. |
| 2017/0314385 | A1 | 11/2017 | Hori et al. |

OTHER PUBLICATIONS

"Measured Depth", Retrieved via internet: https://www.glossary.oilfield.slb.com/Terms/m/measured_depth.aspx; Dec. 17, 2018, Schlumberger Oilfield Glossary (1 page).

"Toolface", [Drilling] Retrieved via internet: https://www.glossary.oilfield.slb.com/Terms/t/toolface.aspx 12/; Dec. 17, 2018, Schlumberger Oilfield Glossary (1 page).

Georgi, D., 1991. Application Time-Series Analysis to Induced Gamma Ray Spectroscopy Logs From Two Cold Lake Heavy-Oil Observation Wells. SPE 19602: 8 pages.

Haldorsen, et al. "Borehole Acoustic Waves" Ridgefield, CT, (2006); 10 pages.

International Search Report, International Application No. PCT/US2018/065965, dated Apr. 9, 2019, Korean Intellectual Property Office; International Search Report 5 pages.

International Written Opinion, International Application No. PCT/US2018/065965, dated Apr. 9, 2019, Korean Intellectual Property Office; International Written Opinion 7 pages.

Li, J., Wang, T. and Georgi, D., 2005. Quantitative Determination of Borehole Image Resolution through Coherence Analysis with Applications to Oil-based Mud Images, Offshore Mediterranean Conference, Ravenna, Italy, 9 pages.

European Office Action for European Application No. 18887918.3; dated Jan. 27, 2023; 5 pages.

* cited by examiner

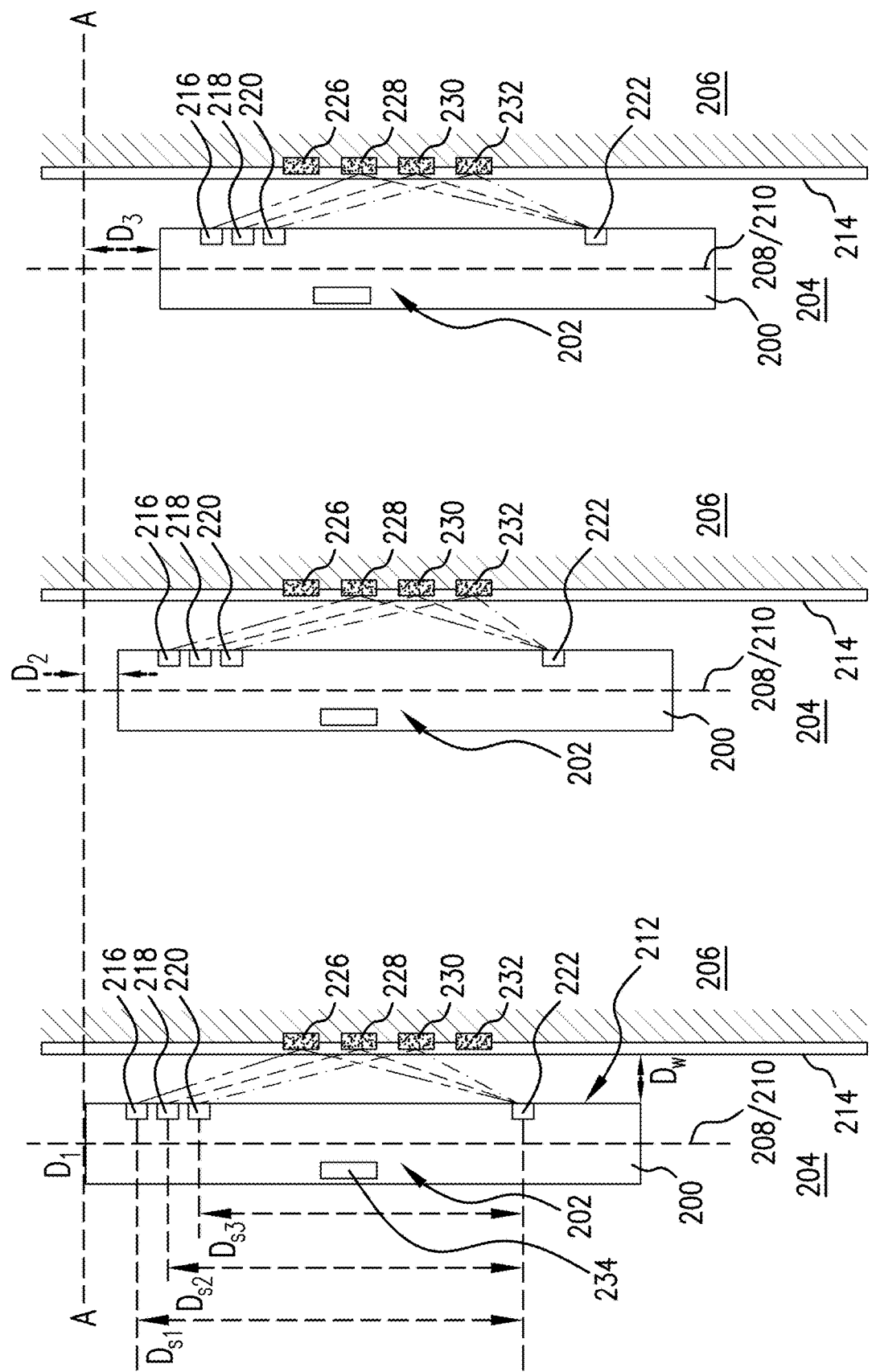

SYSTEMS AND METHODS FOR DOWNHOLE DETERMINATION OF DRILLING CHARACTERISTICS

CROSS-REFERENCE TO RELATED APPLICATIONS

The present application claims priority from U.S. Provisional Patent Application No. 62/599,075, filed Dec. 15, 2017. The contents of the priority application is hereby incorporated by reference in its entirety.

BACKGROUND

1. Field of the Invention

The present invention generally relates to downhole operations and determination of drilling characteristics in situ.

2. Description of the Related Art

Boreholes are drilled deep into the earth for many applications such as carbon dioxide sequestration, geothermal production, and hydrocarbon exploration and production. In all of the applications, the boreholes are drilled such that they pass through or allow access to a material (e.g., a gas or fluid) contained in a formation located below the earth's surface. Different types of tools and instruments may be disposed in the boreholes to perform various tasks and measurements.

Drilling operations are used to form boreholes within earth formations. Characteristics of drilling must be monitored to ensure proper and/or intended drilling is being performed. Accordingly, improved drilling characteristic monitoring may be beneficial, for example monitoring and knowing a real-time or near real-time downhole depth.

In addition, drilling tools are often equipped with formation evaluation sensors configured to sense and/or measure physical or chemical properties of the formation. Typically, formation evaluation sensors acquire data in downhole tools with respect to time. The acquired data is then sent uphole to the earth's surface where it is processed by using a time-depth correlation that is acquired by the surface system and the data is then assigned the respective depth. This method, although commonly used, causes inaccuracies and requires high bandwidth of the telemetry that is used to send the formation evaluation data uphole. In particular if the formation evaluation sensor creates high resolution image data (e.g., three-dimensional data with the formation evaluation data of the sensor assigned to toolface or distance from the borehole and time or depth), the bandwidth of many telemetry techniques is too low to provide the image data at the earth's surface. As a consequence, the image data cannot be used for real-time applications, e.g. to optimize the borehole trajectory.

SUMMARY

Disclosed herein are systems and methods for measuring a characteristic of drilling. The systems and methods may include a downhole tool having a receiver, a first source, and a second source, wherein the first source is located a first separation distance from the receiver and the second source is located a second separation distance from the receiver, wherein the first separation distance is different from the second separation distance; a controller in communication with at least the first and second sources, the controller configured to control the first and second sources to transmit a respective transmitted signal from each of the sources; wherein the receiver is arranged to detect first and second received signals that originate from the first and second sources as the first and second transmitted signals; and a processor configured to determine a characteristic of drilling from the received signals.

Embodiments described herein are directed to processing data downhole to derive parameters with real-time knowledge of the depth downhole. For example, systems and/or methods that are able to provide depth or rate of penetration downhole can be used in conjunction with formation evaluation sensors to provide the depth-based data (e.g., depth-based curves or images) with sufficient accuracy that is required for steering the borehole. In one such example, a so-called dip value (i.e., the angle between a borehole axis and a formation feature, such as a bedding, a layer, a fracture, or a fault) can be determined downhole from shallow resistivity/conductivity, gamma, density, and/or acoustic images, when depth or rate of penetration is known (i.e., when the images are depth-based). In another embodiment, by using a deep reading measurement system, such as deep reading acoustic or electromagnetic imaging system, that provides depth-based acoustic images, a similar angle between borehole axis and formation features can be estimated at a larger distance from the borehole. Transmitting only these angles to the earth's surface would require significantly less bandwidth of the telemetry system and would be possible to transmit with most of the telemetry systems currently in use. In addition, by having the depth information available, it would be also possible to process the formation evaluation data downhole and to use the derived angles automatically in closed loop steering applications.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIG. 2A is a schematic illustration of a downhole tool arrangement in accordance with an embodiment of the present disclosure, located at a first depth;

FIG. 2B is a schematic illustration of the downhole tool of FIG. 2A, located at a second depth;

FIG. 2C is a schematic illustration of the downhole tool of FIG. 2A, located at a third depth;

DETAILED DESCRIPTION

Figure 1:
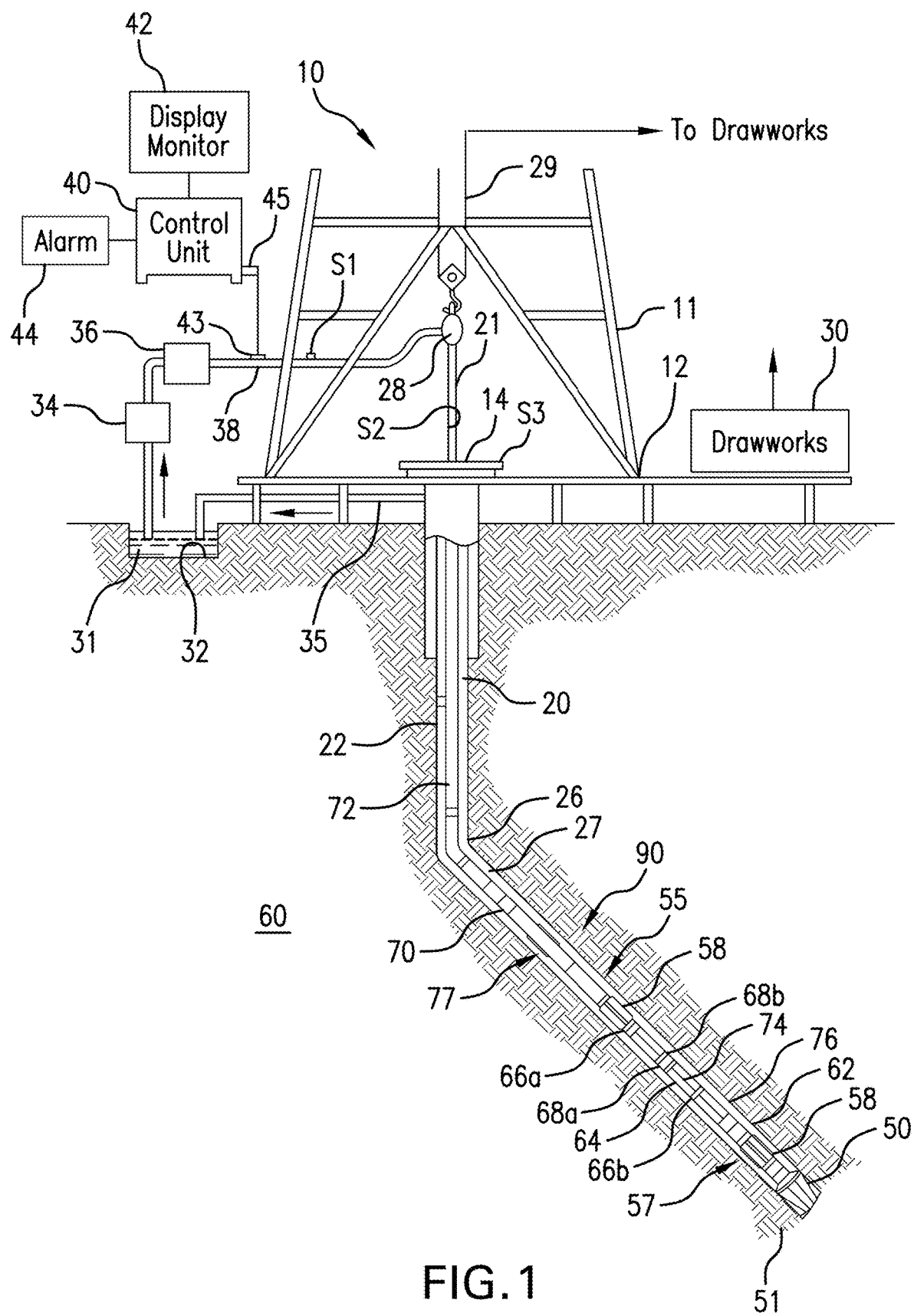
FIG. 1 is an example of a system for performing downhole operations that can employ embodiments of the present disclosure.

FIG. 1 shows a schematic diagram of a system for performing downhole operations. As shown, the system is a drilling system 10 that includes a drill string 20 having a drilling assembly 90, also referred to as a bottomhole assembly (BHA), conveyed in a borehole 26 penetrating an earth formation 60. The drilling system 10 includes a conventional derrick 11 erected on a floor 12 that supports a rotary table 14 that is rotated by a prime mover, such as an electric motor (not shown), at a desired rotational speed. The drill string 20 includes a drilling tubular 22, such as a drill pipe, extending downward from the rotary table 14 into the borehole 26. A disintegrating device 50, such as a drill bit attached to the end of the drilling assembly 90, disintegrates the geological formations when it is rotated to drill the borehole 26. The drill string 20 is coupled to a drawworks 30 via a kelly joint 21, swivel 28 and line 29 through a pulley. During the drilling operations, the drawworks 30 is operated to control the weight on the disintegrating device 50 (e.g., weight-on-bit), which affects the rate of penetration. The operation of the drawworks 30 is well known in the art and is thus not described in detail herein.

During drilling operations a suitable drilling fluid 31 (also referred to as the "mud") from a source or mud pit 32 is circulated under pressure through the drill string 20 by a mud pump 34. The drilling fluid 31 passes into the drill string 20 via a desurger 36, fluid line 38 and the kelly joint 21. The drilling fluid 31 is discharged at the borehole bottom 51 through an opening in the disintegrating device 50. The drilling fluid 31 circulates uphole through the annular space 27 between the drill string 20 and the borehole 26 and returns to the mud pit 32 via a return line 35. A sensor S1 in the line 38 provides information about the fluid flow rate. A surface torque sensor S2 and a sensor S3 associated with the drill string 20 respectively provide information about the torque and the rotational speed of the drill string. Additionally, one or more sensors (not shown) associated with line 29 are used to provide the hook load of the drill string 20 and about other desired parameters relating to the drilling of the borehole 26. The system may further include one or more downhole sensors 70 located on the drill string 20 and/or the drilling assembly 90.

As appreciated by those of skill in the art, sensors may be active sensors or passive sensors. Active sensors send signals into the formation or otherwise energize the formation using one or more transmitters, such as acoustic transmitters (e.g., transmitters of acoustic pulses or waves), electrodes or antennas (e.g., electrodes or antennas to transmit electric fields, or electromagnetic fields, such as electromagnetic waves), or sources (e.g. sources of radioactive radiation), etc. Active sensors further comprise one or more receivers that receive the signals the one or more transmitters are transmitting into the formation and that are modified, transformed, or reflected by the formation. From the modified, transformed, or reflected signals that are received by the receivers, one can conclude on one or more formation properties of interest. In contrast to active sensors, passive sensors do not transmit signals or otherwise energize the formation, to produce received signals. An example of a passive sensor is a thermocouple.

In some applications the disintegrating device 50 is rotated by only rotating the drilling tubular 22. However, in other applications, a drilling motor 55 (e.g., a mud motor or electrical motor) disposed in the drilling assembly 90 is used to rotate the disintegrating device 50 and/or to superimpose or supplement the rotation of the drill string 20. In either case, the rate of penetration (ROP) of the disintegrating device 50 into the borehole 26 for a given formation and a drilling assembly largely depends upon the weight on bit and the drill bit rotational speed. In one aspect of the embodiment of FIG. 1, the drilling motor 55 is coupled to the disintegrating device 50 via a drive shaft (not shown) disposed in a bearing assembly 57. The drilling motor 55 rotates the disintegrating device 50 when it is powered by a power source. For example, the drilling motor 55 can rotate the disintegrating device 50 when the drilling fluid 31 passes through the drilling motor 55 under pressure (e.g., if the drilling motor 55 is a Moineau motor) or when electrical power is provided by a turbine, a power generator, or an energy storage device, such as a battery or a capacitor (e.g., if the drilling motor 55 is an electrical motor). The bearing assembly 57 supports the radial and axial forces of the disintegrating device 50, the downthrust of the drilling motor 55 and the reactive upward loading from the applied weight on the disintegrating device 50. Stabilizers 58 coupled to the bearing assembly 57 and other suitable locations act as centralizers for the lowermost portion of the motor assembly and other such suitable locations.

A surface control unit 40 receives signals from the downhole sensors 70 and devices via a sensor 43 placed in the fluid line 38 as well as from sensors S1, S2, S3, hook load sensors and any other sensors used in the system and processes such signals according to programmed instructions provided to the surface control unit 40. The surface control unit 40 displays desired drilling parameters and other information on a display/monitor 42 for use by an operator at the rig site to control the drilling operations. The surface control unit 40 contains a computer, memory for storing data, computer programs, models and algorithms accessible to a processor in the computer, a recorder, such as tape unit, memory unit, etc. for recording data and other peripherals. The surface control unit 40 also may include simulation models for use by the computer to processes data according to programmed instructions. The control unit responds to user commands entered through a suitable device, such as a keyboard. The control unit 40 is adapted to activate alarms 44 when certain unsafe or undesirable operating conditions occur.

The drilling assembly 90 also contains other sensors and devices or tools for providing a variety of measurements and/or monitoring relating to the formation surrounding the borehole and for drilling the borehole 26 along a desired path. Sensors and devices to provide such measurements and/or monitoring may include device(s) for measuring, monitoring, and/or interacting with a borehole wall and/or formation feature(s). Such devices and/or sensors can include imaging devices that can locate and follow (e.g., relative movement) features or structures in, on, or at the borehole wall and within the formation, and such relative movement can be employed to enable depth tracking, as described herein. Various technologies may be employed, including, but not limited to, resistivity, acoustic and density tools. In some examples, a formation monitoring near and/or in front of the drill bit can be achieved using gamma ray device(s) for measuring the formation gamma ray intensity and other devices for determining the inclination, azimuth, toolface, and position of the drill string. A formation resistivity tool 64, made according an embodiment described herein may be coupled at any suitable location, including above a lower kick-off subassembly 62, for estimating or determining the resistivity of the formation near or in front of the disintegrating device 50 or at other suitable locations. An inclinometer 74 and a gamma ray device 76 may be suitably placed for respectively determining the inclination of the BHA and the formation gamma ray intensity. Any suitable inclinometer and gamma ray device may be utilized. In addition, an azimuth device and/or a toolface device (not shown), such as a magnetometer, a gyroscopic device, or a gravimeter device, may be utilized to determine the drill string azimuth and/or the drill string toolface. Such devices are known in the art and therefore are not described in detail herein. In the above-described exemplary configuration, the drilling motor 55 transfers power to the disintegrating device 50 via a hollow shaft that also enables the drilling fluid to pass from the drilling motor 55 to the disintegrating device 50. In an alternative embodiment of the drill string 20, the drilling motor 55 may be coupled below the resistivity measuring device 64 or at any other suitable place.

Still referring to FIG. 1, other logging-while-drilling (LWD) devices (generally denoted herein by numeral 77), such as devices for measuring formation porosity, permeability, density, rock properties, fluid properties, etc. may be placed at suitable locations in the drilling assembly 90 for providing information useful for evaluating the subsurface formations along borehole 26. Such devices may include, but are not limited to, acoustic tools, nuclear tools, nuclear magnetic resonance tools and formation testing and sampling tools.

The above-noted devices transmit data to a downhole telemetry system 72, which in turn transmits the received data uphole to the surface control unit 40. The downhole telemetry system 72 also receives signals and data from the surface control unit 40 and transmits such received signals and data to the appropriate downhole devices. In one aspect, a mud pulse telemetry system may be used to communicate data between the downhole sensors 70 and devices and the surface equipment during drilling operations. A sensor 43 placed in the mud supply line 38 detects the mud pulses responsive to the data transmitted by the downhole telemetry 72. The sensor 43 (e.g., a transducer) generates electrical signals in response to the mud pressure variations and transmits such signals via a conductor 45 to the surface control unit 40. In other aspects, any other suitable telemetry system may be used for two-way data communication between the surface and the drilling assembly 90, including but not limited to, an acoustic telemetry system, an electromagnetic telemetry system, and a wired pipe. The telemetry system may utilize repeaters in the drill string of the wellbore. The wired pipe may be made up by joining drill pipe sections, wherein each pipe section includes a data communication link that runs along the pipe. The data connection between the pipe sections may be made by any suitable method, including but not limited to, hard electrical or optical connections, induction, capacitive or resonant coupling methods. In case a coiled-tubing is used as the drilling tubular 22, the data communication link may be run along a side of the coiled-tubing.

The drilling system described thus far relates to those drilling systems that utilize a drill pipe to conveying the drilling assembly 90 into the borehole 26, wherein the weight on bit is controlled from the surface, typically by controlling the operation of the drawworks. However, a large number of the current drilling systems, especially for drilling highly deviated and horizontal wellbores, utilize coiled-tubing for conveying the drilling assembly downhole. In such applications, a thruster is sometimes deployed in the drill string to provide the desired force or weight on the disintegrating device. Also, when coiled-tubing is utilized, the tubing is not rotated by a rotary table but instead it is injected into the wellbore by a suitable injector while the drilling motor 55 rotates the disintegrating device 50. For offshore drilling, an offshore rig or a vessel is used to support the drilling equipment, including the drill string.

Still referring to FIG. 1, a resistivity tool 64 may be provided that includes, for example, a plurality of antennas including, for example, transmitters 66a or 66b or and receivers 68a or 68b. Resistivity can be one formation property that is of interest in making drilling decisions. Those of skill in the art will appreciate that other formation property tools can be employed with or in place of the resistivity tool 64.

Liner drilling can be one configuration or operation used for providing a disintegrating device becomes more and more attractive in the oil and gas industry as it has several advantages compared to conventional drilling. One example of such configuration is shown and described in commonly owned U.S. Pat. No. 9,004,195, entitled "Apparatus and Method for Drilling a Wellbore, Setting a Liner and Cementing the Wellbore During a Single Trip," which is incorporated herein by reference in its entirety. Importantly, despite a relatively low rate of penetration, the time of getting the liner to target is reduced because the liner is run in-hole while drilling the wellbore simultaneously. This may be beneficial in swelling formations where a contraction of the drilled well can hinder an installation of the liner later on. Furthermore, drilling with liner in depleted and unstable reservoirs minimizes the risk that the pipe or drill string will get stuck due to hole collapse.

Although FIG. 1 is shown and described with respect to a drilling operation, those of skill in the art will appreciate that similar configurations, albeit with different components, can be used for performing different downhole operations. For example, wireline, coiled tubing, and/or other configurations can be used as known in the art. Further, production configurations can be employed for extracting and/or injecting materials from/into earth formations. Thus, the present disclosure is not to be limited to drilling operations but can be employed for any appropriate or desired downhole operation(s).

Embodiments disclosed herein are directed to systems and methods to determine depth, toolface, arc length rate of penetration ("ROP"), and rotational velocity (e.g., measured in meters per second, degree per second, or revolutions per minute also known as "RPM") downhole by means of formation measurements such as LWD measurements, including but not limited to acoustic, resistivity, electrical, optical, nuclear, etc. That is, by measuring a formation property, it can be concluded on a drilling characteristic that does not depend on the formation of a formation property. Embodiments provided herein are directed to one or more measuring systems that employ multiple sources or an array of sources combined with a single receiver associated with the sources. In some embodiments, each measuring system includes a plurality of sources of a specific type of energy (e.g., acoustic, nuclear, radiation, electrical, optical, etc.) and a single receiver positioned away from the multiple sources, and arranged to receive energy that originates at the multiple sources. In some aspects, the parts of the measuring system may operate automatically or semi-automatically.

One type of source/receiver technology that can be employed in embodiments of the present disclosure is acoustic energy. In such a non-limiting example, a single acoustic receiver is positioned relative to multiple acoustic sources to determine a relative movement of acoustic features (e.g., from changes in acoustic impedance or travel time) of a borehole wall and/or formation (hereinafter referred to as "downhole formation acoustic features" or "formation features") while a drillstring rotates and moves up and down in an axial direction. By following the apparent movement of downhole formation acoustic features via dedicated algorithms, such as computer mouse tracking systems (e.g., coherence or semblance processing, determination autocorrelation, cross-correlation, or statistical correlation) the relative movement of the drillstring versus a calibration point (e.g., a connection depth communicated to the tool via downlink) can be calculated. Tracking relative movement over time enables a calculation of depth, toolface, arc length, ROP, RPM, and/or other characteristics or properties.

Although the following description is directed to acoustic transducers, other physical measurement principles delivering high resolution curves or images of borehole walls by means of a single receiver can be employed without departing from the scope of the present disclosure. For example, embodiments of the present disclosure can include source-receiver configurations for detection of resistivity, nuclear, and/or other types of energy as will be appreciated by those of skill in the art. Further, in some embodiments, converting systems can be employed, such as systems that monitor acoustic-electric effects where a propagating wave causes changes in a distribution of ions in a formation fluid which results in a measurable electrical field. As noted above, non-limiting embodiments are arranged to employ a single acoustic source or an array of acoustic sources combined with a single acoustic receiver to determine a relative movement of downhole formation acoustic features (e.g., based on changes in acoustic impedance or travel time) of a borehole wall while a drillstring rotates and moves up and down.

Turning now to FIGS. 2A-2C, schematic illustrations of a downhole tool 200 having a drilling characteristic measurement system 202 in accordance with a non-limiting embodiment of the present disclosure. The downhole tool 200 is part of a drilling system, such as drilling system 10 shown and described with respect to FIG. 1. Although not shown, various components of the drilling system can be located above and below the downhole tool 200 having the drilling characteristic measurement system 202 of the present embodiment. That is, downhole from the downhole tool 200, a drill bit and other components can be operated to drill a borehole 204 within a formation 206. Uphole from the downhole tool 200 may be various components including, but not limited to, drill string that is rotated to perform a drilling operation.

The downhole tool 200 is positioned within the borehole 204 and is generally positioned along a borehole centerline 208, with a tool axis 210 being aligned with or parallel to the borehole centerline 208. Further, a downhole tool surface 212 is separated from a borehole wall 214 by a wall distance $D_w$. In some embodiments, the wall distance $D_w$ may be zero or close to zero. For example, the downhole tool 200 may comprise a pad (not shown) that is close to or in contact with the formation 206 and equipped with one or more sources or receivers as described below. The drilling characteristic measurement system 202, as shown, includes a first source 216, a second source 218, and a third source 220, located at various known positions on the downhole tool 200, and in some embodiments (depending on source type) known positions on the downhole tool surface 212. In one non-limiting embodiment, the sources 216, 218, 220 are acoustic energy sources, although other energy sources and/or generators can be employed without departing from the scope of the present disclosure, including, but not limited to resistivity, nuclear, etc.

The drilling characteristic measurement system 202 further includes a single receiver 222 positioned away from the sources 216, 218, 220 by a known distance. The receiver 222 is selected to receive energy that originates from the sources 216, 218, 220. As shown, the first source 216 is positioned and separated from the receiver 222 by a first separation distance $D_{s1}$ in the direction of the tool axis 210. The second source 218 is positioned and separated from the receiver 222 by a second separation distance $D_{s2}$ in the direction of the tool axis 210. The third source 220 is positioned and separated from the receiver 222 by a third separation distance $D_{s3}$ in the direction of the tool axis 210. As shown, the first separation distance $D_{s1}$ is greater than the second separation distance $D_{s2}$, and the second separation distance $D_{s2}$ is greater than the third separation distance $D_{s3}$. That is, the sources 216, 218, 220 are positioned at different axial positions along the tool axis 210 of the downhole tool 200.

Also schematically shown in FIGS. 2A-2C, the formation 206 includes a plurality of formation features 226, 228, 230, 232 (e.g., in, at, and/or on a borehole wall, within a formation, etc.). The formation features 226, 228, 230, 232 may be various structures or features within the formation 206 that may be detectable based on the energy of the sources 216, 218, 220, such as formation changes, layers, bedding, fractures, faults, cavities, breakouts, scratches, markers, etc. In an acoustic energy embodiment, the formation features 226, 228, 230, 232 include changes in acoustic impedance or travel time as compared to each other and/or as compared to the formation 206 as a whole (or at least the area around the formation features 226, 228, 230, 232).

An example illustrative description of a general operational principle of using the downhole tool 200 and drilling characteristic measurement system 202 in accordance with an embodiment of the present disclosure is shown in FIGS. 2A-2C. Operation in accordance with the present illustrated embodiment is in an axial direction along the borehole centerline 208 and tool axis 210. Operation of such a configuration can be used for depth/ROP determinations during a drilling operation. The application in a circumferential direction (as compared to axial direction) for determining toolface/arc length/rotational velocity is similar while rotated perpendicular to the tool axis 210, although such configuration is not shown in FIGS. 2A-2C.

As discussed above, the sources 216, 218, 220 can be arranged at known positions relative to the receiver 222. The sources 216, 218, 220 are arranged in a measurement geometry such that the multiple sources 216, 218, 220 and the receiver 222 are arranged in a longitudinal manner along the tool axis 210 of the downhole tool 200.

FIG. 2A illustrates the downhole tool 200 in a first position relative to the formation features 226, 228, 230, 232 and at a first depth within the borehole 204. FIG. 2B illustrates the downhole tool 200 in a second position relative to the formation features 226, 228, 230, 232 and at a second depth within the borehole 204. FIG. 2C illustrates the downhole tool 200 in a third position relative to the formation features 226, 228, 230, 232 and at a third depth within the borehole 204. The first depth $D_1$ shown in FIG. 2A is demarked by a line A-A shown in all of FIGS. 2A-2C, and FIGS. 2B-2C shown a relative increase in depth within the borehole 204 as illustratively shown as an increased separation between the downhole tool 200 and the line A-A. As such, in FIG. 2B, the downhole tool 200 is at a second depth $D_2$ and in FIG. 2C, the downhole tool 200 is at a third depth $D_3$. Advantageously, the separation distances $D_{s1}$, $D_{s2}$, $D_{s3}$ between the sources 216, 218, 220 and the receiver 222 along or on the downhole tool 200 or the distance of the downhole tool 200 to the borehole wall 214, wall distance $D_w$, is known which can be used for a more accurate processing of the receiver signals.

As noted, the formation features 226, 228, 230, 232 are features of the formation 206 that are detectable by the drilling characteristic measurement system 202, e.g., by acoustic measurement. As illustratively shown in FIG. 2A, a first measurement is performed at the first depth $D_1$. Each source 216, 218, 220 transmits energy ("transmitted signal") into an annulus between the tool surface 212 and the borehole wall 214. The energy is transformed or modified by the formation. For example, the attenuation may be reflected ("reflected signal") at one or more formation features (e.g., contrasts of physical properties, such as contrasts of acoustic impedance) that act as reflector elements and the modified signals are detected or otherwise registered at the receiver 222. The amplitude of the reflected signal is a measure of the surface, the distance to the drilling characteristic measurement system 200, or other aspect of the formation features 226, 228, 230, 232 (e.g., borehole wall 214 and/or formation 206).

In accordance with embodiments of the present disclosure, because only one receiver (receiver 222) is used in combination with multiple sources (sources 216, 218, 220), the sources 216, 218, 220 may be fired at the same time or successively such that the receiver 222 detects a single received signal at a given time or instance. When firing the multiple sources successively, the firing times may be close together so that the movement of the characteristic measurement system 202 between the firing times can be neglected or assumed to be constant. The drilling characteristic measurement system 202, as shown, includes a control unit 234 that is in communication with the sources 216, 218, 220 and the receiver 222. The control unit 234 includes a processor or controller that is configured to control the sources 216, 218, 220. The control unit 234, as shown, is part of the downhole tool 200, although in some embodiments, the control unit for the drilling characteristic measurement system 202 of embodiments disclosed herein can be located elsewhere, such as in other downhole tools and/or at the surface and/or be separated into multiple elements and/or components at different locations or as part of a single/unitary control unit (e.g., source control, data processing, controller, processor, etc.). The control unit 234 can control the first source 216 to fire or generate a first transmitted signal which is then detected by the receiver 222 as a first received signal. After the detection of the first received signal at the receiver 222, the control unit 234 can control the second source 218 to fire or generate a second transmitted signal which is detected by the receiver 222 as a second received signal. Finally, in the embodiments of FIG. 2A, after the detection of the second received signal at the receiver 222, the control unit 234 can control the third source 220 to fire or generate a third transmitted signal which is detected by the receiver 222 as a third received signal.

In other embodiments, each source 216, 218, 220 can generate a distinguishable transmitted signal. For example, the respective transmitted signals differ from each other based on waveform including amplitude, frequency, frequency content, etc. so that the received signal can be associated with the different individual sources.

As will be appreciated by those of skill in the art, based on the separation distances $D_{s1}$, $D_{s2}$, $D_{s3}$, and the relative location of the receiver 222, the different received signals will represent the relative formation features. That is, at the first depth $D_1$, as schematically shown in FIG. 2A, the first transmitted signal from the first source 216 is modified, transformed, or reflected by the first formation feature 226 and is received at the receiver 222, however, because of the angle and fixed positions, the first transmitted signal from the first source 216 is not modified, transformed, or reflected by any of the other formation features 228, 230, 232 in a manner that is detected at the receiver 222. As schematically shown, a second transmitted signal transmitted from the second source 218 is modified, transformed, or reflected by the second formation feature 228 and a third transmitted signal is transmitted from the third source 220 and is modified, transformed, or reflected by the third formation feature 230. As shown, no received signal is based on modification, transformation, or reflection by the fourth formation feature 232.

The downhole tool 200 then moves downhole within the borehole 204 to the second depth $D_2$, as shown in FIG. 2B. At the second depth $D_2$, a first transmitted signal from the first source 216 is modified, transformed, or reflected by the second formation feature 228, a second transmitted signal from the second source 218 is modified, transformed, or reflected by the third formation feature 230, and a third transmitted signal from the third source 220 is modified, transformed, or reflected by the fourth formation feature 232. Because of the movement of the downhole tool 200, no signal will be modified, transformed, or reflected by the first formation feature 226 and be received by the receiver 222.

The downhole tool 200 then moves downhole within the borehole 204 to the third depth $D_3$, as shown in FIG. 2C. At the third depth $D_3$, a first transmitted signal from the first source 216 is modified, transformed, or reflected by the third formation feature 230, a second transmitted signal from the second source 218 is modified, transformed, or reflected by the fourth formation feature 230, and a third transmitted signal from the third source 220 is modified, transformed, or reflected by the borehole wall 214 at a point 236 that does not includes a formation feature. Because of the movement of the downhole tool 200, no signal will be modified, transformed, or reflected by the first or second formation features 226, 228 and be received by the receiver 222.

The control unit 234 can receive data collected at the receiver 222 to perform analysis thereon. For example, the control unit 234 can be configured to make drilling characteristic measurements based on the received signals at the receiver 222 and knowing the relative locations of the sources 216, 218, 220. In some embodiments, the control unit 234 can be configured to transmit data and/or information regarding the sources 216, 218, 220 and/or the receiver 222 (including captured/received signals) to other electronics located downhole and/or to the surface. The drilling characteristic measurements may include depth, toolface, arc length, ROP, RPM, or other aspects of a drilling operation. In some embodiments, the process can involve determining a characteristic of the received signal(s) and then deriving a drilling characteristic from the determined received signal characteristic.

The received signals may be combined to data sets. For example, when sources 216, 218, 220 are fired simultaneously, the received signals caused by the simultaneous firing of the sources 216, 218, 220 may be combined to one data set. The data set may be a two-dimensional data set that may be represented in an x-y-plot, for example by a curve, a bar chart, a scatter plot, or similar. Within the two-dimensional data set, the received signals may be assigned to time (e.g., the time of measurement) or depth (e.g., the depth of the transmitter that transmitted the received signal). In such an embodiment, the received signals represent a first dimension and the time or the depth represent the second dimension of the two-dimensional data set. In another embodiment, the data set may be a three-dimensional data set that may be represented by an image. For example, combined with the rotation of the drillstring, of which the downhole tool 200 is a part, each combination of sources 216, 218, 220 scans one line of the borehole wall 214 that is parallel to the tool axis 210. By rotating downhole tool 200 about tool axis 210, multiple lines in various toolface directions can be scanned. By combining the scanned lines, a three-dimensional data set, such as an image will be produced. In such a three-dimensional data set, the received signals represent a first dimension, the time or the depth represent the second dimension, and a toolface (e.g., the toolface of the receiver at the time of the measurement) may be the third dimension. Data sets may also be combined from received signals that were created from transmitted signals from sources 216, 218, 220 that are not fired simultaneous but with a small time difference and/or that may transmit signals that differ with respect to amplitude, waveform, phase, or frequency. The data sets that are combined from the received signals, may be each assigned to a single acquisition time or depth. For example, the acquisition time/depth of a data set may be a time/depth of the first received signal/receiver at the time of the first received signal, the time/depth of the last received signal/receiver at the time of the last received signal, or similar.

Figure 3A:
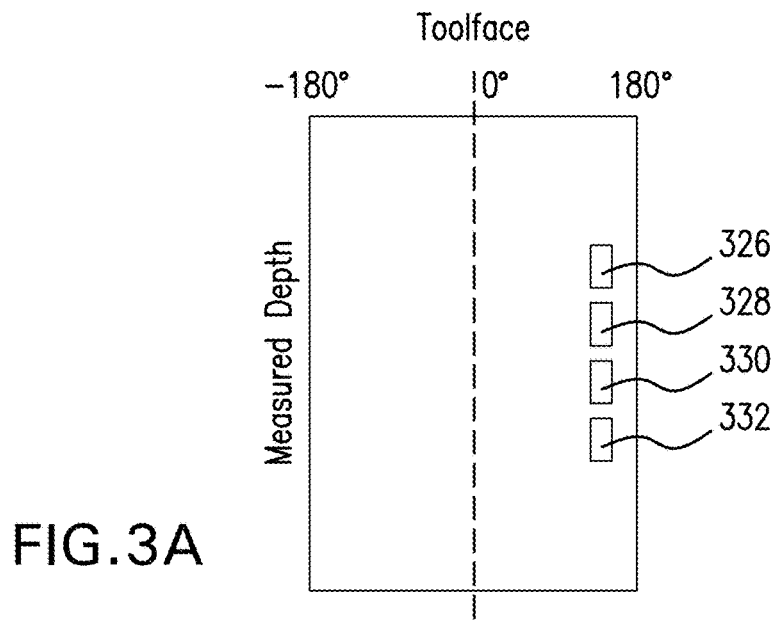
FIG. 3A is a schematic illustrative plot of measured depth/toolface signals received at a receiver of the downhole tool of FIG. 2A at the first depth.
Figure 3B:
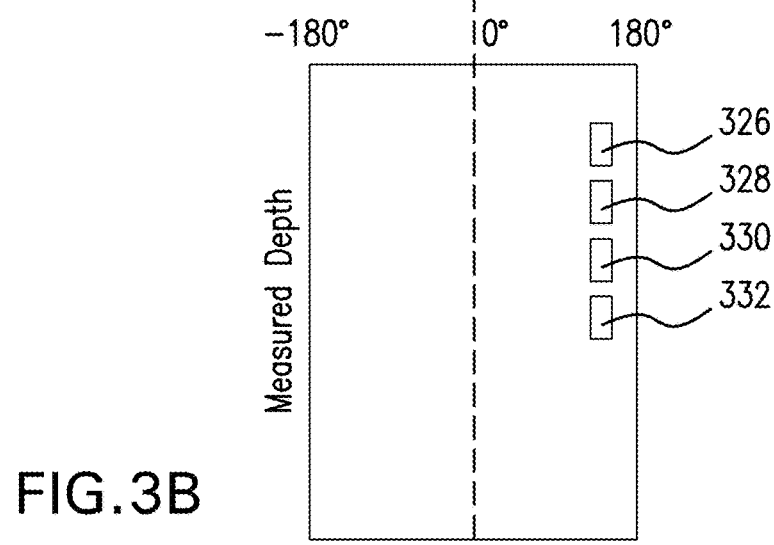
FIG. 3B is a schematic illustrative plot of measured depth/toolface signals received at a receiver of the downhole tool of FIG. 2A at the second depth.
Figure 3C:
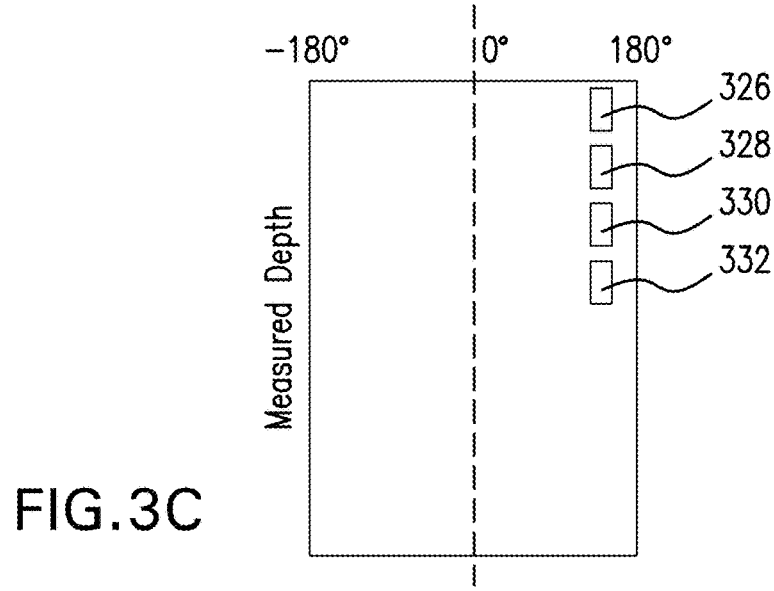
FIG. 3C is a schematic illustrative plot of measured depth/toolface signals received at a receiver of the downhole tool of FIG. 2A at the third depth.

For example, turning now to FIGS. 3A-3C, schematic illustrative plots of measured depth and toolface versus signals received at a receiver of a drilling characteristic measurement system in accordance with an embodiment of the present disclosure are shown. As used herein, the term measured depth refers to any measurement indicative of distance along or parallel to the tool axis (e.g., tool axis 210 in FIGS. 2A-2C) with respect to a reference location on or in the downhole tool, on or in the drillstring, in the borehole, on the borehole wall, in the formation, or on the earth's surface. The measured depth shown in FIGS. 3A-3C may be equal or related to the first, second, and third separation distances $D_{s1}$, $D_{s2}$, and $D_{s3}$ and may be referenced to the location of the receiver (e.g., receiver 222) or another location on the downhole tool 200 or in the drillstring. Alternatively, various processing steps and corrections may lead to a measured depth that is closer to the real distance of formation features and/or is referenced to a location in the borehole, on the borehole wall, in the formation, or on the earth's surface.

Various formation features 326, 328, 330, 332 are shown in FIGS. 3A-3C, with some of the formation features 326, 328, 330, 332 correlating and corresponding to some of the formation features 226, 228, 230, 232 shown in FIGS. 2A-2C. Further, FIG. 3A correlates or corresponds to a measurement made at the first depth $D_1$ shown in FIG. 2A; FIG. 3B correlates or corresponds to a measurement made at the second depth $D_2$ shown in FIG. 2B; and FIG. 3C correlates or corresponds to a measurement made at the third depth $D_3$ shown in FIG. 2C. As shown, the toolface is constant from one measurement to the next, but the measured depth increases (and the formation features 326, 328, 330, 332 move upward in the plots).

Figure 4A:
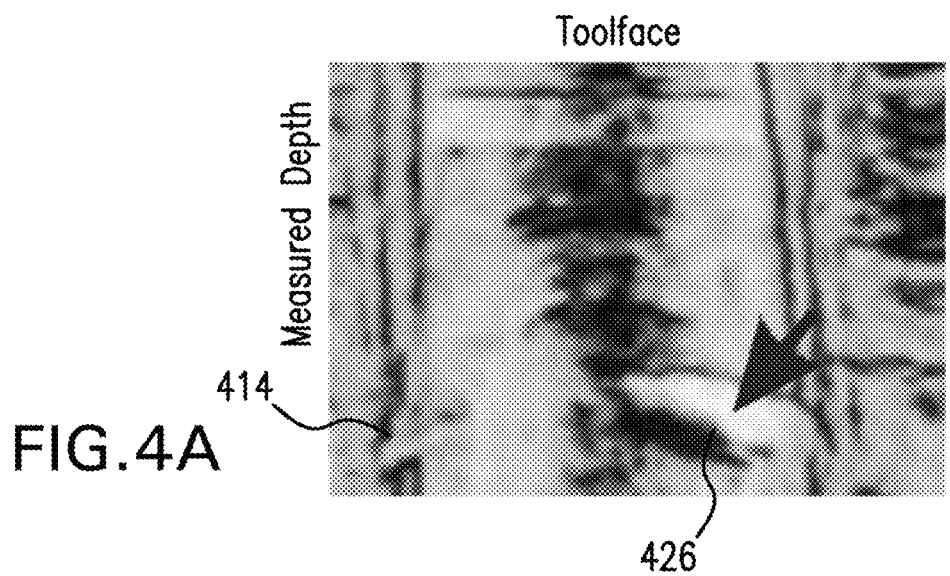
FIG. 4A is a schematic illustrative acoustic image of a formation feature as detected by a receiver of the downhole tool of FIG. 2A at the first depth.
Figure 4B:
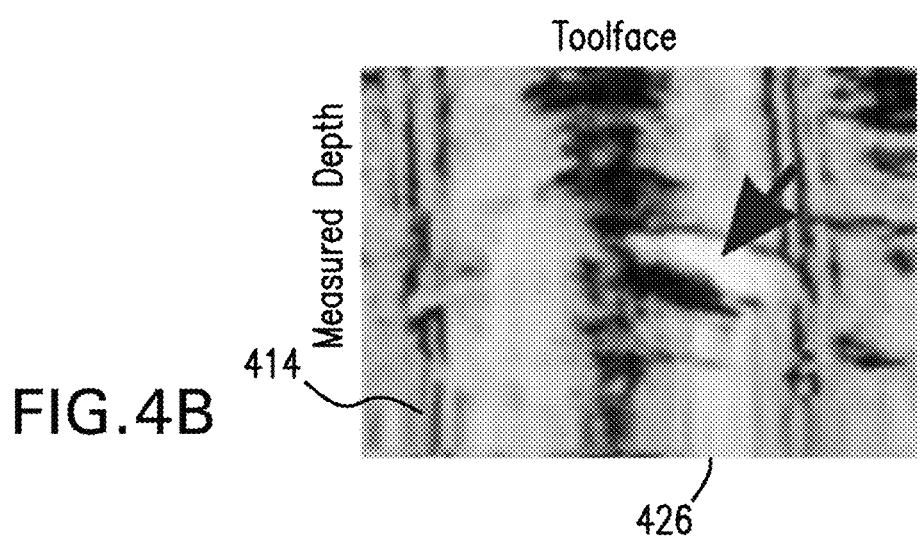
FIG. 4B is a schematic illustrative acoustic image of a formation feature as detected by a receiver of the downhole tool of FIG. 2A at the second depth.
Figure 4C:
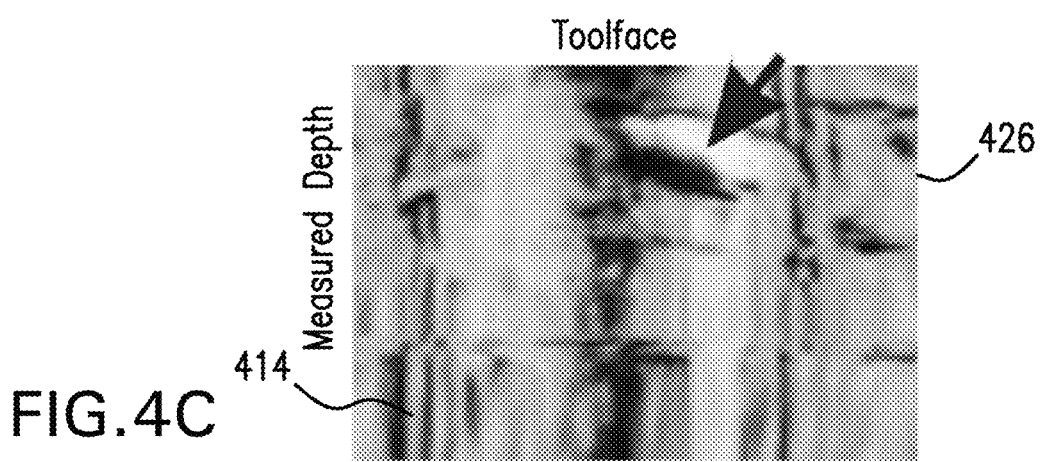
FIG. 4C is a schematic illustrative acoustic image of a formation feature as detected by a receiver of the downhole tool of FIG. 2A at the third depth.

Turning now to FIGS. 4A-4C, example acoustic images of a borehole wall 414 having a formation feature 426 as obtained using a drilling characteristic measurement system in accordance with the present disclosure are shown. The measurement (depth, toolface, etc.) using the drilling characteristic measurement systems of the present disclosure can be performed by monitoring the movement of the formation feature 426 identified in images of the borehole wall 414 while drilling is continued, i.e., while the drillstring rotates and propagates through the formation. FIG. 4A is an illustrative image obtained at the first depth $D_1$ shown in FIG. 2A; FIG. 4B is an illustrative image obtained at the second depth $D_2$ shown in FIG. 2B; and FIG. 4C is an illustrative image obtained at the third depth $D_3$ shown in FIG. 2C. The assigned acquisition times of the images in FIGS. 4A-4C can be used in conjunction with the measured depth or toolface information of one or more formation features 426 that can be identified in the image to determine the rate of penetration or rotational velocity. For example, by measuring the distance in measured depth of formation feature 426 in FIGS. 4A-4B, and dividing it by the difference in the corresponding acquisition times, the rate of penetration can be calculated. Similarly, by measuring the distance in toolface or circumferential distance of a formation feature and dividing it by the different in the corresponding acquisition times, the rotational velocity can be calculated.

In accordance with some embodiments, the measurements made will be relative measurements, and thus a "zero depth" or calibration point or depth should be established. Accordingly, in accordance with some embodiments, one or more calibration depths may be obtained, calculated, stored, and then used to make various relative depth measurements. In some embodiments, the calibration depths could be connection depths or any other depth pre-programmed into the downhole tool or communicated to the downhole tool while drilling via downlink. In some embodiments, if pre-programmed into the downhole tool, additional measurements may be performed to follow the sequence of connection depths. Alternatively, regular downlinks can be employed to provide an accurate calibration of depth method. In some embodiments, calibration depths can be marked in the formation (e.g., by scratching the formation, solid marker(s), radioactive marker(s), magnetic marker(s), etc.) that can be detected by drilling characteristic measurement system 202 and that can be "reused" as additional quality check, such as during pulling out of the borehole, during wiper trips, etc.

In operation, and with reference again to FIGS. 2A-2C, to determine a relative depth movement of the drillstring, measurements are performed at the first, second, and third depths $D_1$, $D_2$, $D_3$. A comparison of the obtained images can be used to perform various calculations and/or determinations related to drilling characteristics. To enable such comparisons, the images produced at subsequent depths should have overlap with the image of the previous depth. As such, as illustrated in FIGS. 4A-4C, the formation features identified in the image(s) appear to move with the movement of the downhole tool. Because the source/receiver configuration of embodiments of the present disclosure is fixed (e.g., known separations distances $D_{s1}$, $D_{s2}$, $D_{s3}$ between the sources 216, 218, 220 and the receiver 222) the apparent movement of observed formation features is directly proportional to the movement of the drillstring (e.g., a change in depth). A correction may be applied, such as in cases where the tool changes its position within the borehole diameter while measuring, e.g., when a tool centralization is lost or where the distance from the tool 200 to the borehole wall varies for other reasons, such as when breakouts or cavities are present at the borehole wall or when the borehole diameter varies (e.g., oversized borehole due to whirl). As such, an image measurement as described herein may be combined with a caliper measurement to obtain such a correction.

The measurement of relative movement of the formation feature can be added to the last depth calibration point to obtain an accurate depth measurement. The identification and monitoring of formation features in accordance with embodiments of the present disclosure can be completely autonomous and performed downhole process. For example, in some embodiments, the drilling characteristic measurements can be performed by comparison algorithms, such as from robot and computer mouse tracking algorithms. Potential methods to be employed with various embodiments of the present disclosure can include, but are not limited to, semblance detection, coherency processing, and pattern recognition.

The sources of embodiments of the present disclosure can be selected for a specific source energy or measurement system. For example, in some embodiments, acoustic sources used for caliper measurements operating in the higher Kilohertz to lower Megahertz range are suitable candidates. In such acoustic systems, the receiver may be a broadband piezoceramic receiver.

Although shown in FIGS. 2A-2C with a specific arrangement of sources, those of skill in the art will appreciate that various other arrangements are possible without departing from the scope of the present disclosure. While FIGS. 3A-3C and FIGS. 4A-4C were used to describe how to determine depth, ROP, arc length, toolface, or rotational velocity information from images (e.g., three-dimensional data sets), it is clear that the same technique can be utilized by using two-dimensional data sets (such as curves). In various embodiments of the present disclosure, the arrangement of the sources and/or source array (e.g., an array with multiple source points) can be in arrangement, including, but not limited to, one-dimensional and two-dimensional arrangements. For example, turning to FIGS. 5A-5E, various non-limiting example arrangements of sources 525a-e on respective downhole tools 500a-e are shown.

Figure 5E:
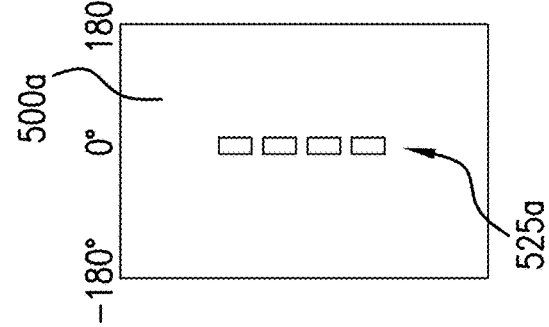
FIG. 5E is a schematic illustration of another source arrangement on a tool body in accordance with an embodiment of the present disclosure.
Figure 5D:
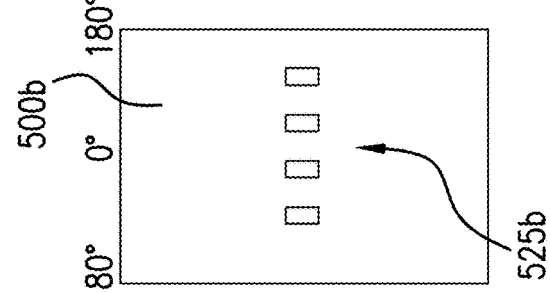
FIG. 5D is a schematic illustration of another source arrangement on a tool body in accordance with an embodiment of the present disclosure.
Figure 5C:
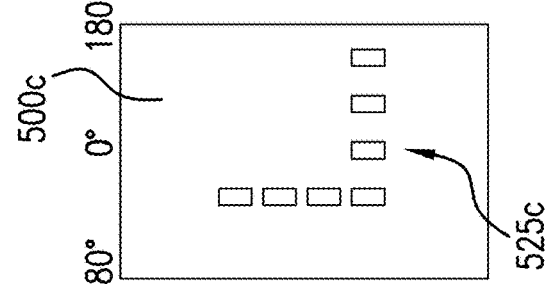
FIG. 5C is a schematic illustration of another source arrangement on a tool body in accordance with an embodiment of the present disclosure.
Figure 5B:
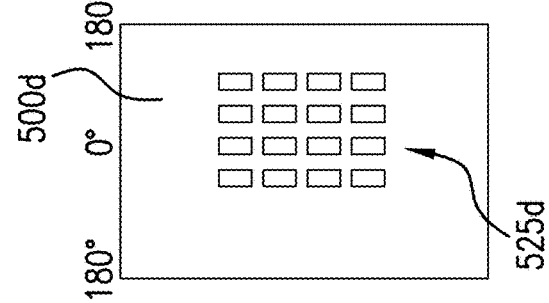
FIG. 5B is a schematic illustration of another source arrangement on a tool body in accordance with an embodiment of the present disclosure.
Figure 5A:
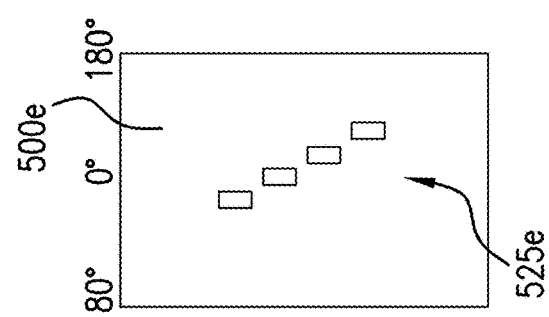
FIG. 5A is a schematic illustration of a source arrangement on a tool body in accordance with an embodiment of the present disclosure.

In FIG. 5A, a linear, one-dimensional arrangement of sources 525a are shown on the downhole tool 500a. This arrangement is similar to that shown and described with respect to FIGS. 2A-4C. The sources 525a are arranged in a line that is parallel with a tool axis and can be employed to measure depth (e.g., as shown in the above described embodiments).

In FIG. 5B, another one-dimensional arrangement of sources 525b on a downhole tool 500b is schematically shown. In the embodiment of FIG. 5B, the sources 525b are distributed about a circumference of the downhole tool 500b. As such, the sources 525b can be employed to determine arc length, toolface, and/or rotational velocity by transmitting signals that can modified, transformed, or reflected by formation features similar that shown and described above, with a single receiver able to determine circumferential offsets and extract toolface information regarding a drilling operation.

FIGS. 5C-5E illustrate two-dimensional arrangements of sources 525c, 525d, 525e on tools 500c, 500d, 500e, respectively. In such arrangements, a single receiver can be arranged a known distance from the various sources 525c, 525d, 525e to receive signals that originate from the sources 525c, 525d, 525e. The two-dimensional arrangements shown in FIGS. 5C-5E can be used to determine both depth/rate of penetration and toolface/arc length/rotational velocity information.

In alternative embodiments, instead of using multiple sources, a single source may be used in combination with a single receiver. In such embodiments of the present disclosure, the single source can be controlled by a control unit to output a modulated or focused transmitted signal that is controlled in a manner that modified, transformed, or reflected signals from multiple formation features can successively be detected by the single receiver. Such an embodiment may be employed using a mechanical steerable source with a focused radiation pattern or a single but segmented source assembly using beam steering technology. Such single-source/single-receiver embodiments may employ acoustic and non-acoustic measurement (source/receiver) devices.

At times, generated formation features can be provided in accordance with embodiments of the present disclosure. For example, it may be desirable to customize and/or ensure that a source/receiver system can interact with a formation feature. Thus, not only may the source and receiver be predefined, but in some embodiments, the formation feature can also be pre-defined and even generated from a downhole component (e.g., part of drilling system, part of the drilling characteristic measurement system, etc.). Such generated formation features can be employed in cases of very homogenous formations without distinctive features that are detectable by a source/receiver arrangement may require embedding elements into the formation. For example, a formation marking device can be used to generate, create, or impregnate the formation with one or more detectable markings/features/patterns. Various types of markings can include, but are not limited to, scratch marks (e.g., generated by a stabilizer of the drilling system), projectiles, etc.

In accordance with embodiments of the present disclosure, drilling characteristic measurement systems on downhole tools are provided having multiple sources or signal generators (e.g., acoustic, radiation, electrical, etc.) with a single receiver or detector. The drilling characteristic measurement systems of the present disclosure can provide accurate drilling characteristic calculations (e.g., depth, arc length, toolface, ROP, RPM) based on measuring movement of the downhole tool which is part of a drillstring, with the movement relative to one or more formation features. From measurement of the relative movement detected, a rate of penetration can be obtained, and then can determine, from a calibrated location or a reference location, total depth or position of the drilling characteristic measurement system, downhole tool, and/or drilling system elements (e.g., disintegrating device 50).

In operation, multiple sources generate signals that interact with a formation feature (e.g., an acoustically reflective feature), and the signals are then detected by a single detector/receiver (e.g., detection of a reflected signal). As the drillstring moves within the borehole, the receiver/detector can measure signals from each of the signal generators/sources which are located at known distances relative to the detector/receiver, and thus distance traveled (and rate of penetration) can be obtained.

In some embodiments, transmission from generators/sources can be separated in time or using different wavelengths, frequencies, transmission times, etc. to be distinguished by the detector/receiver. Accordingly, various techniques can be employed without departing from the scope of the present disclosure. The signals transmitted from the sources can be controlled by a control unit that is part of and/or in control of the drilling characteristic measurement system.

As noted above, the formation feature exists downhole in or on a wall of a borehole or in the formation. In some embodiments, the formation feature can be natural (e.g., fracture, change in material of formation, boundary, fluid deposits, etc.) or can be artificial, such as provided by a downhole tool (e.g., scratch marks, projectiles, injected fluids, etc.).

The arrangement of the multiple sources/generator can be predetermined based on a desired type of measurement to be made. For example, the sources/generators can be positioned longitudinally and/or circumferentially about a downhole tool (e.g., as shown in FIGS. 5A-5D). Using an arrangement of sources or source array that extends axially along a tool body, the sources can be used to measure a longitudinal distance traveled by the tool body and thus a tool depth. Using an arrangement of sources or source array that extends circumferentially about a tool body, the sources can be used to measure a circumferential distance (i.e., an arc length) or a toolface interval and thus a rotational velocity of the tool.

As will be appreciated by those of skill in the art, various embodiments of the present disclosure are directed to multiple signal sources located at specific known locations on downhole tool relative to a single receiver that is located at specific known location. In some embodiments, multiple receivers may be employed, wherein the number of sources and receivers is not equal (e.g., different number of sources and receivers). The receiver detects signals generated from each of the multiple sources after the signals interact with a formation feature that is on a borehole wall or within a formation. From the multiple detections and association with each of the sources, a drilling characteristics (e.g., ROP, RPM, depth, arc length, toolface, etc.) can be determined accurately, automatically and downhole (in situ or in real-time). From the drilling characteristic calculation, a depth/axial position/circumferential position/toolface relative to a reference point can be determined.

While embodiments described herein have been described with reference to specific figures, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed, but that the present disclosure will include all embodiments falling within the scope of the appended claims or the following description of possible embodiments.

Embodiment 1

A downhole drilling characteristic measurement system for measuring a characteristic of drilling through the earth's subsurface, the system comprising: a downhole tool having an active measurement system, comprising a receiver, a first transmitter, and a second transmitter; a controller in communication with the first transmitter and the second transmitter, the controller configured to control the first transmitter and the second transmitter to transmit a first transmitted signal from the first transmitter and a second transmitted signal from the second transmitter, wherein the receiver is arranged to receive a first received signal from the first transmitted signal and a second received signal from the second transmitted signal; and a processor configured to determine a characteristic of drilling from the first received signal and the second received signal.

Embodiment 2

The system according to any of the embodiments described above, wherein the characteristic of drilling is indicative of at least one of a rate of penetration, a depth, a rotational velocity, an arc length, and a toolface.

Embodiment 3

The system according to any of the embodiments described above, wherein: the controller is configured to control the first and second transmitter to transmit a third transmitted signal from the first transmitter and a fourth transmitted signal from the second transmitter; the receiver is arranged to receive a third received signal from the third transmitted signal and a fourth received signal from the fourth transmitted signal; the processor creates a first data set comprising the first received signal and the second received signal and a second data set comprising the third received signal and the fourth received signal; and the characteristic of drilling is determined based on the first data set and the second data set.

Embodiment 4

The system according to any of the embodiments described above, wherein the determination of the characteristic of drilling comprises a comparison of the first data set and the second data set.

Embodiment 5

The system according to any of the embodiments described above, wherein the first data set is assigned to a first acquisition time and the second data set is assigned to a second acquisition time and the characteristic of drilling is determined by using the first acquisition time and the second acquisition time.

Embodiment 6

The system according to any of the embodiments described above, wherein the first and second transmitters are at least one of acoustic signal generators, resistivity signal generators, electrical signal generators, optical signal generators, nuclear signal generators, or combinations thereof.

Embodiment 7

The system according to any of the embodiments described above wherein: the first transmitter is located at a first position having a first depth and a first toolface and the second transmitter is located at a second position having a second depth and a second toolface; at least one of the first depth is different from the second depth and the first toolface is different from the second toolface; and the characteristic of drilling is determined by using at least one of (i) the first depth and the second depth and (ii) the first toolface and the second toolface.

Embodiment 8

The system according to any of the embodiments described above, further comprising a third transmitter configured to transmit a third transmitted signal, wherein: the receiver is arranged to receive a third received signal from the third transmitted signal, the third transmitter is located at a third position having a third depth and a third toolface, at least one of (i) the first depth and the second depth is different from the third depth and (ii) the first toolface and the second toolface is different from the third toolface, and the processor is configured to determine the characteristic of drilling from the first received signal, the second received signal, and the third received signal by using at least one of (i) the first depth, the second depth, and the third depth and (ii) the first toolface, the second toolface, and the third toolface.

Embodiment 9

The system according to any of the embodiments described above, wherein the first transmitted signal has a first frequency and the second transmitted signal has a second frequency different from the first frequency.

Embodiment 10

The system according to any of the embodiments described above, the system further comprising a formation evaluation sensor on the downhole tool, the formation evaluation sensor providing formation evaluation data, wherein the processor is configured to create a depth-based image from the formation evaluation data by using the characteristic of drilling.

Embodiment 11

A method for measuring a characteristic of drilling through the earth's subsurface, the method comprising: conveying a downhole drilling tool into the earth's subsurface, the downhole drilling tool having an active measurement system, the active measurement system comprising a receiver, a first transmitter, and a second transmitter; transmitting a first transmitted signal from the first transmitter; transmitting a second transmitted signal from the second transmitter; receiving, with the receiver, a first received signal from the first transmitted signal and a second received signal from the second transmitted signal; and determining, with a processor, a characteristic of drilling from the first received signal and the second signal.

Embodiment 12

The method according to any of the embodiments described above, wherein the characteristic of drilling is indicative of at least one of a rate of penetration, a depth, rotational velocity, an arc length, and a toolface.

Embodiment 13

The method according to any of the embodiments described above, further comprising: transmitting, by the first transmitter, a third transmitted signal; transmitting, by the second transmitter, a fourth transmitted signal; receiving, by the receiver, a third received signal from the third transmitted signal and a fourth received signal from the fourth transmitted signal; creating, with the processor, a first data set comprising the first received signal and the second received signal and a second data set comprising the third received signal and the fourth received signal; and determining the characteristic of drilling based on the first data set and the second data set.

Embodiment 14

The method according to any of the embodiments described above, wherein determining the characteristic of drilling comprises a comparison of the first data set and the second data set.

Embodiment 15

The method according to any of the embodiments described above, wherein the first data set is assigned to a first acquisition time and the second data set is assigned to a second acquisition time and determining the characteristic of drilling comprises using the first acquisition time and the second acquisition time.

Embodiment 16

The method according to any of the embodiments described above, wherein the first and second transmitters are at least one of acoustic signal generators, resistivity signal generators, electrical signal generators, optical signal generators, nuclear signal generators, or combinations thereof.

Embodiment 17

The method according to any of the embodiments described above, wherein: the first transmitter is located at a first position having a first depth and a first toolface and the second transmitter is located at a second position having a second depth and a second toolface, at least one of (i) the first depth is different from the second depth and (ii) the first toolface is different from the second toolface, and determining the characteristic of drilling comprises using at least one of (i) the first depth and the second depth and (ii) using the first toolface and the second toolface.

Embodiment 18

The method according to any of the embodiments described above, wherein the active measurement system further comprises a third transmitter located at a third position having a third depth and a third toolface, wherein at least one of (i) the first depth and the second depth is different from the third depth and (ii) the first toolface and the second toolface is different from the third toolface, the method further comprising: transmitting a third transmitted signal from the third transmitter; receiving, with the receiver, a third received signal from the third transmitted signal; and determining, with the processor, the characteristic of drilling from the first received signal, the second received signal, and the third received signal by using at least one of (i) the first depth, the second depth, and the third depth and (ii) the first toolface, the second toolface, and the third toolface.

Embodiment 19

The method according to any of the embodiments described above, wherein the first transmitted signal has a first frequency and the second transmitted signal has a second frequency different from the first frequency.

Embodiment 20

The method according to any of the embodiments described above, wherein the downhole drilling tool further comprises a formation evaluation sensor, the method further comprising: providing, with the formation evaluation sensor, formation evaluation data; and creating, with the processor, a depth-based image from the formation evaluation data by using the characteristic of drilling.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. Components like, for example, controllers, computer processing systems, processors, and signal processors may comprise central processing units (CPUs). In embodiments, some components may have one or more CPUs. In other embodiments, CPUs may be shared between various components. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The flow diagram(s) depicted herein is just an example. There may be many variations to this diagram or the steps (or operations) described therein without departing from the scope of the present disclosure. For instance, the steps may be performed in a differing order, or steps may be added, deleted or modified. All of these variations are considered a part of the present disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semisolids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

What is claimed is:

1. A downhole drilling characteristic measurement system for measuring a characteristic of drilling through the earth's subsurface, the downhole drilling characteristic measurement system comprising:
   a downhole tool having an active measurement system, comprising a receiver, a first transmitter, and a second transmitter;
   a controller in communication with the first transmitter and the second transmitter, the controller configured to control the first transmitter and the second transmitter to transmit a first transmitted signal from the first transmitter and a second transmitted signal from the second transmitter, wherein the receiver is arranged to receive a first received signal from the first transmitted signal and a second received signal from the second transmitted signal; and
   a processor configured to determine the characteristic of drilling from the first received signal and the second received signal, wherein the characteristic of drilling is indicative of at least one of a rate of penetration, a depth, a rotational velocity, an arc length, and a toolface,
   wherein the downhole tool is configured to rotate about a longitudinal tool axis and the first transmitter and the second transmitter are both positioned uphole relative to the receiver or the first transmitter and the second transmitter are both positioned downhole relative to the receiver along the longitudinal tool axis.

2. The downhole drilling characteristic measurement system of claim 1, wherein the processor and the controller are configured to use the same central processing unit (CPU).

3. The downhole drilling characteristic measurement system of claim 1, wherein:
   the first transmitter is located at a first position having a first depth and a first toolface and the second transmitter is located at a second position having a second depth and a second toolface;
   at least one of the first depth is different from the second depth and the first toolface is different from the second toolface; and
   the characteristic of drilling is determined by using at least one of (i) the first depth and the second depth and (ii) the first toolface and the second toolface.

4. The downhole drilling characteristic measurement system of claim 3, further comprising a third transmitter configured to transmit a third transmitted signal, wherein:
   the receiver is arranged to receive a third received signal from the third transmitted signal,
   the third transmitter is located at a third position having a third depth and a third toolface,
   at least one of (i) the first depth and the second depth is different from the third depth and (ii) the first toolface and the second toolface is different from the third toolface, and
   the processor is configured to determine the characteristic of drilling from the first received signal, the second received signal, and the third received signal by using at least one of (i) the first depth, the second depth, and the third depth and (ii) the first toolface, the second toolface, and the third toolface.

5. The downhole drilling characteristic measurement system of claim 1, wherein the first transmitted signal has a first frequency and the second transmitted signal has a second frequency different from the first frequency.

6. The downhole drilling characteristic measurement system of claim 1, further comprising a formation evaluation sensor on the downhole tool, the formation evaluation sensor providing formation evaluation data, wherein the processor is configured to create a depth-based image from the formation evaluation data by using the characteristic of drilling.

7. A method for measuring a characteristic of drilling through the earth's subsurface, the method comprising:
   conveying a downhole drilling tool into the earth's subsurface, the downhole drilling tool having an active measurement system, the active measurement system comprising a receiver, a first transmitter, and a second transmitter;
   transmitting a first transmitted signal from the first transmitter;
   transmitting a second transmitted signal from the second transmitter;
   receiving, with the receiver, a first received signal from the first transmitted signal and a second received signal from the second transmitted signal; and
   determining, with a processor, the characteristic of drilling from the first received signal and the second received signal, wherein the characteristic of drilling is indicative of at least one of a rate of penetration, a depth, a rotational velocity, an arc length, and a toolface,
   wherein the downhole drilling tool is configured to rotate about a longitudinal tool axis and the first transmitter and the second transmitter are both positioned uphole relative to the receiver or the first transmitter and the second transmitter are both positioned downhole relative to the receiver along the longitudinal tool axis.

8. The method of claim 7, wherein the first and second transmitters are at least one of acoustic signal generators, resistivity signal generators, electrical signal generators, optical signal generators, nuclear signal generators, or combinations thereof.

9. The method of claim 7, wherein:
   the first transmitter is located at a first position having a first depth and a first toolface and the second transmitter is located at a second position having a second depth and a second toolface,
   at least one of (i) the first depth is different from the second depth and (ii) the first toolface is different from the second toolface, and
   determining the characteristic of drilling comprises using at least one of (i) the first depth and the second depth and (ii) using the first toolface and the second toolface.

10. The method of claim 9, wherein the active measurement system further comprises a third transmitter located at a third position having a third depth and a third toolface, wherein at least one of (i) the first depth and the second depth is different from the third depth and (ii) the first toolface and the second toolface is different from the third toolface, the method further comprising:
   transmitting a third transmitted signal from the third transmitter;
   receiving, with the receiver, a third received signal from the third transmitted signal; and
   determining, with the processor, the characteristic of drilling from the first received signal, the second received signal, and the third received signal by using at least one of (i) the first depth, the second depth, and the third depth and (ii) the first toolface, the second toolface, and the third toolface.

11. The method of claim 7, wherein the first transmitted signal has a first frequency and the second transmitted signal has a second frequency different from the first frequency.

12. The method of claim 7, wherein the downhole drilling tool further comprises a formation evaluation sensor, the method further comprising:
providing, with the formation evaluation sensor, formation evaluation data; and
creating, with the processor, a depth-based image from the formation evaluation data by using the characteristic of drilling.

13. A downhole drilling characteristic measurement system for measuring a characteristic of drilling through the earth's subsurface, the downhole drilling characteristic measurement system comprising:
a downhole tool having an active measurement system, comprising a receiver, a first transmitter, and a second transmitter;
a controller in communication with the first transmitter and the second transmitter, the controller configured to control the first transmitter and the second transmitter to transmit a first transmitted signal from the first transmitter and a second transmitted signal from the second transmitter, wherein the receiver is arranged to receive a first received signal from the first transmitted signal and a second received signal from the second transmitted signal; and
a processor configured to determine the characteristic of drilling from the first received signal and the second received signal,
wherein the controller is configured to control the first and second transmitter to transmit a third transmitted signal from the first transmitter and a fourth transmitted signal from the second transmitter;
the receiver is arranged to receive a third received signal from the third transmitted signal and a fourth received signal from the fourth transmitted signal;
the processor creates a first data set comprising the first received signal and the second received signal and a second data set comprising the third received signal and the fourth received signal; and
the characteristic of drilling is determined based on the first data set and the second data set.

14. The downhole drilling characteristic measurement system of claim 13, wherein the determination of the characteristic of drilling comprises a comparison of the first data set and the second data set.

15. The downhole drilling characteristic measurement system of claim 13, wherein the first data set is assigned to a first acquisition time and the second data set is assigned to a second acquisition time and the characteristic of drilling is determined by using the first acquisition time and the second acquisition time.

16. A method for measuring a characteristic of drilling through the earth's subsurface, the method comprising:
conveying a downhole drilling tool into the earth's subsurface, the downhole drilling tool having an active measurement system, the active measurement system comprising a receiver, a first transmitter, and a second transmitter;
transmitting a first transmitted signal from the first transmitter;
transmitting a second transmitted signal from the second transmitter;
receiving, with the receiver, a first received signal from the first transmitted signal and a second received signal from the second transmitted signal; and
determining, with a processor, the characteristic of drilling from the first received signal and the second received signal;
transmitting, by the first transmitter, a third transmitted signal;
transmitting, by the second transmitter, a fourth transmitted signal;
receiving, by the receiver, a third received signal from the third transmitted signal and a fourth received signal from the fourth transmitted signal;
creating, with the processor, a first data set comprising the first received signal and the second received signal and a second data set comprising the third received signal and the fourth received signal; and
determining the characteristic of drilling based on the first data set and the second data set.

17. The method of claim 16, wherein determining the characteristic of drilling comprises a comparison of the first data set and the second data set.

18. The method of claim 16, wherein the first data set is assigned to a first acquisition time and the second data set is assigned to a second acquisition time and determining the characteristic of drilling comprises using the first acquisition time and the second acquisition time.

* * * * *